(12) United States Patent
Clark et al.

(10) Patent No.: US 6,659,236 B1
(45) Date of Patent: Dec. 9, 2003

(54) PARKING BRAKE

(75) Inventors: Neil J. Clark, Granger, IN (US);
Thomas E. Demoise, Jr., Osceola, IN (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 10/184,454

(22) Filed: Jun. 28, 2002

(51) Int. Cl.⁷ .......................... F16D 51/00; F16D 65/52; F16D 55/16
(52) U.S. Cl. ................. 188/79.52; 188/79.51; 188/196 V; 188/72.7
(58) Field of Search .................. 188/71.1, 71.2, 188/71.7, 71.8, 71.9, 72.1, 72.7, 72.8, 72.9, 73.1, 73.31, 73.35, 73.36, 73.38, 79.51, 79.52, 79.55, 75, 196 R, 196 V, 202

(56) References Cited

U.S. PATENT DOCUMENTS

| | | | | |
|---|---|---|---|---|
| 2,790,515 A | * | 4/1957 | Hawley | 188/72.3 |
| 2,888,104 A | * | 5/1959 | Frayer | 188/71.8 |
| 3,788,430 A | * | 1/1974 | Hurt | 188/72.6 |
| 3,920,103 A | * | 11/1975 | Haraikawa | 188/71.9 |
| 3,991,859 A | * | 11/1976 | Coulter et al. | 188/71.9 |
| 3,995,722 A | * | 12/1976 | Jones et al. | 188/71.9 |
| 4,006,802 A | * | 2/1977 | Evans | 188/196 D |
| 4,246,985 A | * | 1/1981 | Shimizu et al. | 188/71.9 |
| 4,278,152 A | * | 7/1981 | Tosi | 188/71.9 |
| 4,306,635 A | * | 12/1981 | Mitchell | 188/72.4 |
| 4,917,220 A | * | 4/1990 | Ikegami | 188/196 D |
| 4,927,187 A | * | 5/1990 | Sanford et al. | 285/80 |
| 5,038,895 A | * | 8/1991 | Evans | 188/72.7 |
| 5,086,884 A | * | 2/1992 | Gordon et al. | 188/71.9 |
| 6,116,386 A | * | 9/2000 | Martin | 188/218 XL |
| 6,264,011 B1 | * | 7/2001 | Zernickel | 188/72.8 |

FOREIGN PATENT DOCUMENTS

JP          5986723 A    *    5/1984

* cited by examiner

Primary Examiner—Matthew C. Graham
Assistant Examiner—Melody M. Burch
(74) Attorney, Agent, or Firm—Leo H McCormick, Jr.; Warren Comstock

(57) ABSTRACT

A disc brake having a ball-in-ramp actuator retained in a caliper for supplying a piston with a static clamping force to move first and second friction members into frictional engagement with a rotor to effect a parking brake application. The clamping force is transmitted from the ball-in-ramp actuator into the piston through an adjustment screw mechanism. The disc brake being susceptible to a thermal expansion and a thermal contraction and as a result the effect of the clamping force applied to bring the first and second friction members into engagement with the rotor may change during a time period that the parking brake application is initiated until it is terminated. The adjustment screw mechanism is characterized by a spring that is compressed by the actuation force to initiate the parking brake application that expands and contracts to compensate for the thermal contraction and expansion of the disc brake such that the effect of the static clamping force remains substantially the same for the duration time of the parking brake application.

4 Claims, 3 Drawing Sheets

PARKING BRAKE

This invention relates to a parking brake and includes structure to compensate for dimensional changes in a disc brake caused by thermal expansion and contraction to sustain an initial clamping force developed to effect a parking brake application a substantially constant level for the duration of a parking brake application.

BACKGROUND OF THE INVENTION

It was common for vehicles to have with drum brakes on the front and rear wheels however after a number of years the drum brakes on the front wheels were replaced with disc brakes. Later the drum brakes associated with the rear wheel were replaced with disc brakes such that now it is not unusual for disc brake to be located on all four wheels of a vehicle. When disc brakes are located on the rear wheel of a vehicle it was necessary to revise the parking brake structure In order to provide a total brake system. The importance of a parking brake is of great importance in a vehicle having a manual transmission as the parking brake is utilized to hold a vehicle in a stationary location and in particular if the manual gear is in neutral. In the manufacture of a vehicle a customer is usually is a choice for the structure for a parking brake as illustrated by the drum-in-hat brake disclosed in U.S. Pat. No. 5,180,037, the integral piston brake disclosed in U.S. Pat. No. 5,038,895 or a separate brake as disclosed in U.S. Pat. No. 5,921,354. In each of the parking brake systems, a input force from an operator is applied through a lever to mechanically move friction members into engagement with a drum or a rotor associated with a wheel to effect a parking brake application. While these systems function in an adequate manner for most brake applications should a number of service brake applications be made in a relative short period of time, the temperature created during a brake application may cause significant thermal expansion in the disc brake. Unfortunately should such thermal expansion occur and a mechanical force is applied to effect a parking braking application as the disc brake cools the initial clamping force developed to initiate the parking brake application is reduced as both the rotor and caliper undergo a thermal contraction and as a result the clamping force changes such that the friction engagement of the pads with the rotor may not be adequate to hold a vehicle on an incline surface. A solution to this type situation, defined as creep, is addressed in U.S. Pat. No. 5,921,354 where a self-energizing structure is introduced to modify the force on a separate parking brake on movement of rotor after a parking brake is applied. While this solution may achieve a desired result, the added cost and additional brake components have not yet been accepted by the industry

SUMMARY OF THE INVENTION

A primary object of the present invention is to provide a disc brake having an integral parking brake with means to compensate for the effect of thermal expansion and contraction of a disc brake such that a clamping force initiated to effect a parking brake application remains static from inception until termination in urging friction members into engagement with a rotor.

In more particular detail, the disc brake according to the present invention has a support member secured to a vehicle. The support member has first and second guides that align a caliper over a rotor associated with a wheel of the vehicle. The caliper has an actuation section with a bore therein for retaining a piston to define an actuation chamber. The actuation section is connected to an arm by a bridge that extends over the rotor. A first friction member associated with the piston is located on one side of the rotor and a second friction member connected to the arm is located on the other side of the rotor such that the first and second friction members are aligned with each other on opposite sides of the rotor. In response to an operator input, pressurized fluid from a source is presented the actuation chamber to effect a service brake application. The pressurized fluid acts on the piston and actuation section to develop a dynamic clamping force that urges the first and second friction members into engagement with the rotor to effect a corresponding first or service brake application. The length of time and force applied to develop a service brake application varies and is under the constant control of an operator such that when the operator has determined that sufficient braking has been achieved to produce a desired reduction in speed or actually brought a vehicle to a stop, the operator may remove the input force and the dynamic clamping force acting on the piston and actuator section is terminated. The parking brake structure in this disc brake assembly is characterized by a ball-in-ramp actuator and a screw adjustment mechanism through which a static clamping brake force is applied to effect a parking brake application. The ball-in-ramp actuator has a first member that is axially retained in the actuation chamber and is connected to a lever mechanically linked to receive an input force from an operator and a second member that is radially retained in the actuation chamber while the adjustment screw mechanism has a first end that is connected to the second member of the ball-in-ramp actuator and a second end that engages the piston. The first member of the ball-in-ramp actuator responds to an input force applied to the lever by rotating and moving ball in a ramp to axially move the second member and transmit an actuation force through the adjustment screw mechanism into the piston to produce a second or static clamping force. The static clamping force acts on and moves the piston and actuation section such that the first and second friction members are urged into engagement with the rotor to effect a second or parking brake application. The caliper, support member and rotor are susceptible to thermal expansion and thermal contraction that may cause dimensional changes. The adjustment screw mechanism is characterized by spring means that compensates for dimensional changes in the caliper, support member and rotor by sustaining a substantially same static actuation force on piston such that the clamping force remains static for the duration of a parking brake application.

An advantage of the disc brake provided by the present invention resides in a parking brake having a static clamping force to maintain a substantially same level of engagement force between friction pads and a rotor during a parking brake application.

An object of this invention is to provide a disc brake assembly with spring means to compensate for dimensional changes that may occur as a result of thermal contraction in a rotor and caliper such that a clamping force remains static for the duration of a parking brake application.

DETAILED DESCRIPTION

Figure 1:
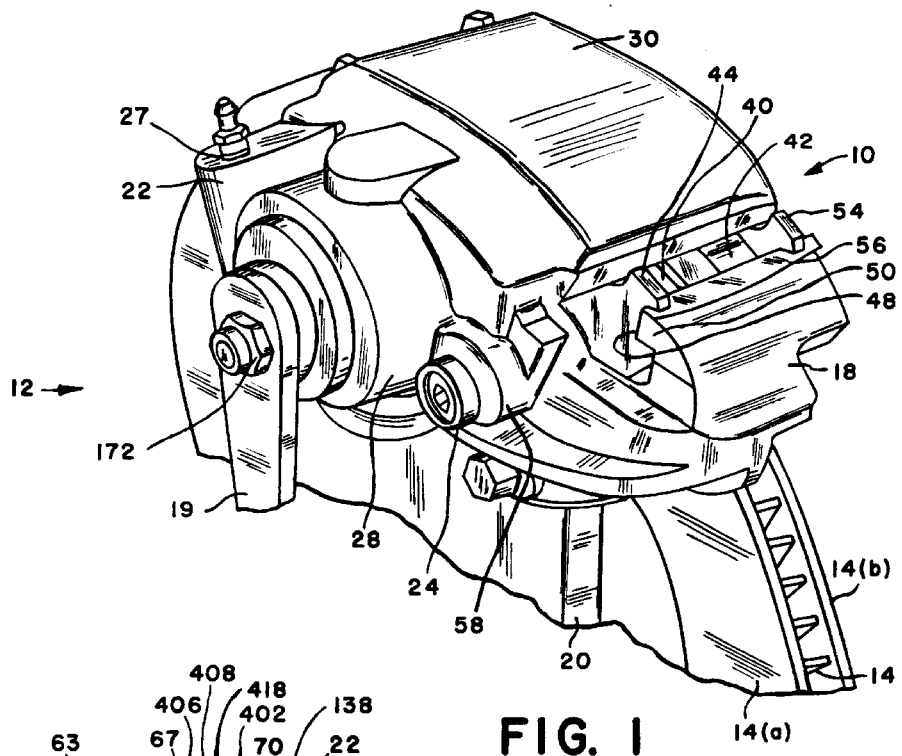
FIG. 1 is a perspective view of a disc brake for a vehicle having an integral parking brake assembly made according to the principals of the present invention.
Figure 2:
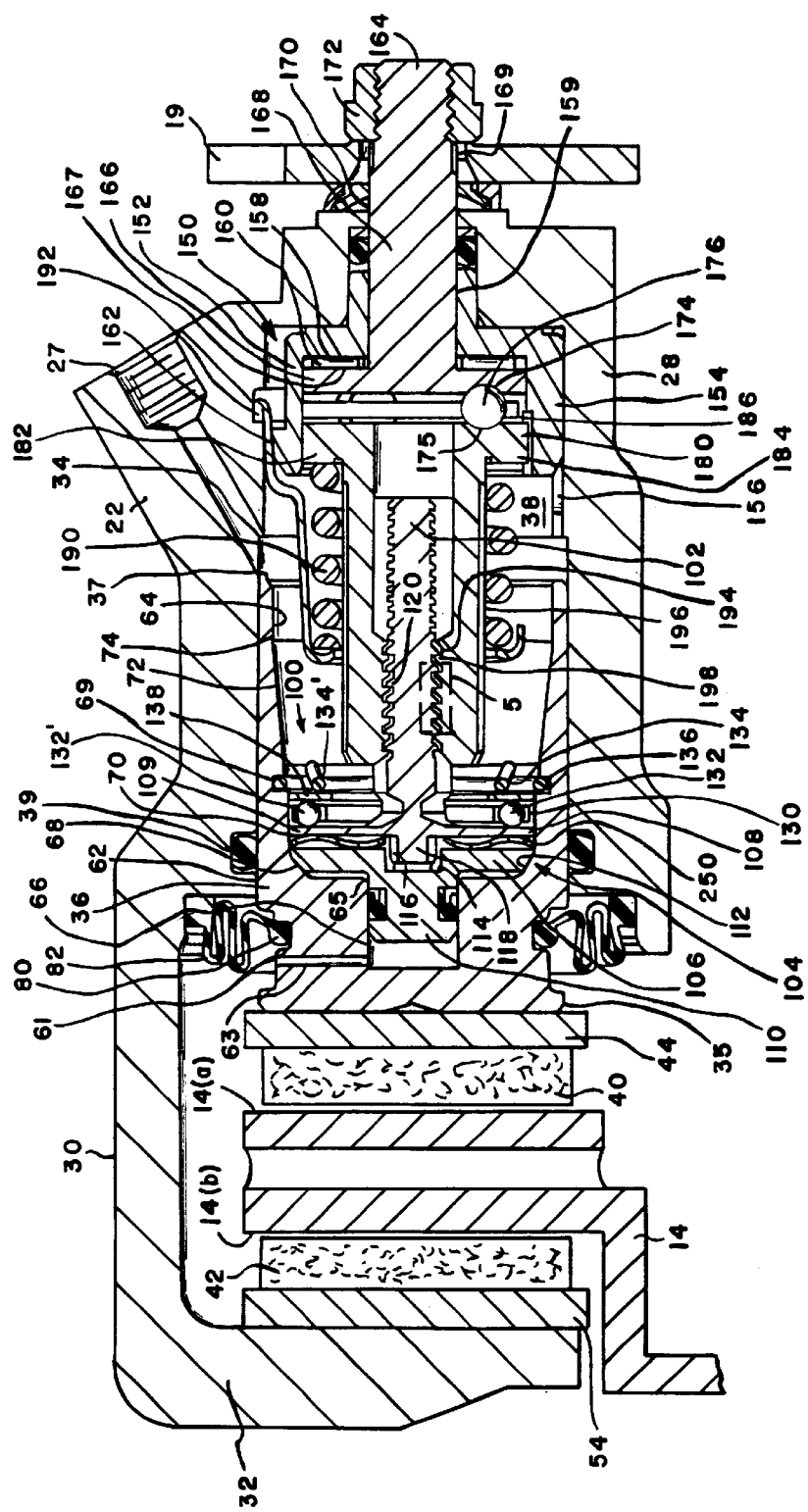
FIG. 2 is a sectional of the disc brake and parking brake assembly of FIG. 1 illustrating a rest position.

The disc brake 10 utilized as a service brake in a vehicle shown in FIGS. 1 and 2 includes an integral parking brake assembly 12 for use as a parking and emergency brake. The structure for the service brake vehicle is similar to the structure disclosed in U.S. Pat. Nos. 5,810,122 and 5,988,761 whereas the structure the parking brake assembly is similar to the structure disclosed in U.S. Pat. Nos. 5,038,895 and 5,609,227 but modified to include the structure and function advantage defined by the present invention. In general, the actuation piston for the disc brake 10 responds to a hydraulic input force to develops clamping force during the duration of a service brake application whereas according to the present invention the clamping force remains static for a duration of a parking or emergency braking application. The modification of the structure of the integral parking brake assembly 12 through the present invention includes a wave washer, spring, rubber disc or some other resilient member 250 that is located between an adjustment screw mechanism 100 and the actuation piston 36 to compensate for dimensional changes that result from thermal expansion and contraction of the disc brake 10 and rotor 14. The spring 250 reacts to such dimensional changes to maintain an initial clamping force developed to effect the parking brake application in a static condition for the duration of the parking brake application.

Since a majority of the structural components of the disc brake 10 and integral parking brake 12 are known and conventional as disclosed in the above identified patents, only those components that are necessary for an understanding of the additional structure and function of the present invention will hereinafter be described in more detail.

The disc brake 10 includes an anchor or support member 18 that is fixed to a frame member 20 of a vehicle in a manner as disclosed in U.S. Pat. No. 5,988,761 and an integral caliper 22 that is connected to the support member 18 in a manner defined by guide pins 24 (only one is shown in the drawing). The integral caliper 22 for the disc brake 10 includes an actuation section 28 that is connected by a bridge 30 to a u-shaped arm 32. The actuation section 28 has a stepped bore 34 therein and with an actuation piston 36 defines an actuation chamber 38. The actuation chamber 38 also retains an integral parking brake assembly 12. A first friction member 40 is connected to piston 36 while a second friction member 42 is connected to arm 32. The first friction member 40 includes a backing plate 44 with a first engagement surface 48 on one end thereon that engages a first rail 50 and a second engagement surface on a second end that engages a second rail on the opposite side the support member 18 while the second friction member 42 includes a backing plate 54 with a first engagement surface 56 that engages the first rail 50 and a second engagement surface that engages the second rail. The first 50 and second rails are parallel to each other and an integral part of the anchor or support member 18. When the anchor member 18 is fixed to frame 20 of the vehicle, the first 50 and second rails are located in a perpendicular relationship with rotor 14 such that the first 40 and second 42 friction members are respectively positioned in parallel planes adjacent a first face 14a and a second face 14b of a rotor 14 that rotates with an axle of the vehicle. An ear 58 that extends from the actuation section 28 and is mounted to slide on a first guide pin 24 attached to the anchor support member 18 and a second ear (not shown) that extends from the actuation section 28 is mounted to slide on a second guide pin (not shown) attached to the anchor or support member 18. The first (24) and second guide pins anchor or support member 18 are spaced apart and also parallel to each other to respectively hold the first 58 and second ears in a parallel relationship with the first 50 and second guide rails to assist in defining the perpendicular relationship between the rotor faces 14a and 14b and first friction member 40 and the second friction member 42. During a brake application, caliper 22 slides with respect to the support member 18 and the first 24 and second guide pins to maintain a parallel relationship between the friction members 40 and 42 and their corresponding engagement surfaces 14a and 14b on rotor 14.

Piston 36 has a cylindrical body 62 with a stepped internal bore 64 therein that extends from an opened end 37 toward a closed end 35. Backing plate 44 of friction member 40 is attached to the closed end 35 while the opened end 37 is sealingly located in actuation chamber 38 and selectively receives pressurized fluid from port 27 to effect a service brake application. The stepped internal bore 64 of piston 36 is designed to receive the adjustment screw mechanism 100 of the integral parking assembly 12 and includes at least the following functional surfaces: a first diameter section 66 that transitions from a shoulder 65 into a first conical section 68 adjacent a second diameter section 70 and a second conical section 72 that transitions from a groove 69 adjacent the second diameter section 70 into a third diameter section 74 adjacent the opened end 37. A static seal 39 carried by the caliper housing 22 engages piston 36 to seal the actuation chamber 38 while a peripheral groove 61 on piston 36 receives a bead 80 on a dust boot 82 to prevent the communication of dust and water from entering bore 34. Piston 36 has a passage 63 that connects the first diameter section 66 with the atmosphere.

The integral parking assembly 12 that is located in bore 34 to provide for a parking or emergency brake includes a screw adjustment mechanism 100, the ball-in-ramp actuator 150 and a lever 19, as best illustrated in FIG. 2.

The ball-in-ramp actuator 150 has a cylindrical sleeve 152 with a rib 154 thereon that is located in a groove 156 in caliper 22 to keep the sleeve 152 from rotating within bore 34, a bearing surface 158 on which a thrust bearing 160 is positioned and an axial surface 162 that is concentric with bore 34. A first member 164 that makes up the ball-in-ramp actuator 150 has a cylindrical head 166 that is located within sleeve 152 and a stem 168. A first part of stem 168 is positioned on bearing surface 159 and a second part extends through opening 170 in the actuation section 28 of the caliper 22. A lever 19 through which an input from the operator is supplied to effect a parking or emergency brake application is retained on the end of stem 168 by nut 172. Nut 172 is tightened on stem 168 with torque until lever 19 engages shoulder 169, at this time thrust bearing 160 will also engage bearing surface 167 on head 166 and bearing surface 158 on sleeve 152 such that sleeve 152 engages housing or caliper 22 to fix the lever 19 with respect to caliper 22. Head 166 has a plurality of spherical indentations 174 (only one of which is shown) for partially retaining balls 176 (only one of which is shown) while a cylindrical head 180 on a second member (or cylindrical member) 182 has a plurality of annular radial slot 175 that varies in depth to form a ramp for retaining balls 176. The head 180 of the second member 182 of the ball-in-ramp actuator 150 has a cylindrical body with plurality of ribs 184 (only one is shown) that are located in slots 186 (only one is shown) in sleeve 152. A return spring 190 that is caged between head 180 and a fixture 192 attached to sleeve 152 acts on head 180 to retain the balls 176 in the indentation 174 and ramp 175. The slots 186 prevent head 180 from rotating but movement of the balls 176 on ramp 175 but direct the force into the second member 182 and after overcoming return spring 190 to allow for axial movement of the member 182 within bore 34. Head 180 also has a cylindrical body or stem 194 that extends therefrom with a bore 196 located therein. The bore 196 is threaded with spiral helical threads 198 that accept corresponding threads 120 on stem 102 of the adjustment screw mechanism 100.

Figure 3:
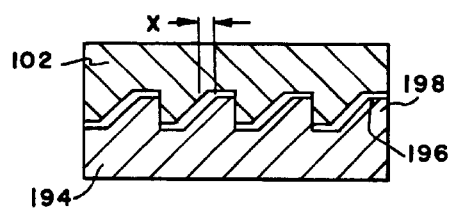
FIG. 3 is an enlarged view of the connection between the ball-in-ramp actuator and screw adjustment mechanism of FIG. 2.

The adjustment screw mechanism 100 in addition to stem 102 has a head 104 with a first section or member 106 and a second section or member 108. The first section 106 has a generally cylindrical body with projection 110 that extends into and is sealingly retained in the first diameter 66 in piston 36 while a peripheral surface 112 thereon is designed to be mated with the conical surface 68 in bore 64 of piston 36. The cylindrical body of the first section 106 has an axial opening 114 with slots and lands that receive complementary slots and lands 116 on a projection 118 that extends from a cylindrical base 109 of the second section 108. The cylindrical base 109 of the second section 108 is an integral part of stem 102. The threads 120 on stem 102 are mated with threads 198 in bore 196 of stem 194 in a manner as illustrated in FIG. 3. The threads 120 on stem 102 and of the threads 198 in bore 196 are asymmetrical and have a pitch of approximately 2.5 mm with side slopes of 10 degrees and 45 degrees with a desired lash "x" of approximately 0.06 mm created there between. This lash is beneficial and as will be later discussed permits limited axial movement between the adjustment screw mechanism 150 and ball-in-ramp actuator 100 during a service brake application. A force transmitting wave washer or spring 250 is retained between the first section 106 and cylindrical base 109 of the second section 108. A roller bearing 130 having a plurality of balls 132, 132' (only two are shown) is urged against the base 109 of the second section 108 by the spring action of arms 134, 134' that extend from snap ring 136 located in groove 69 that act on washer 138. The spring action of arms 134, 134' acts through spring 250 to urge conical surface 112 of the first section 106 into engagement with conical surface 68 on piston 36 and functions as a clutch face to provide frictional resistance to the rotation of head 104 within piston 36.

MODE OF OPERATION

When an operator of a vehicle that includes a disc brake 10 desires to effect a service brake application, an input force is applied to a brake pedal and a control valve is activated to supply hydraulic fluid from a source to actuation chamber 38 by way of port 27. The pressurized hydraulic fluid in actuation chamber 38 acts on piston 36 and actuation section 28 to develop a clamping force that moves the first friction member 40 toward face 14a and the second friction member 42 toward face 14b to effect a corresponding brake application. The clamping force is considered to be dynamic as the operator may change the input force at any time during the brake application in bringing the vehicle to a stop or at least reduce the rotation of the wheel of the vehicle to slow the vehicle to a desired speed.

During a service brake application, the pressurized hydraulic fluid also acts on head 104 of the adjustment screw mechanism 100 and as a result stem 102 moves with respect to the ball-in-ramp actuator 150, an amount defined by lash "x", and conical surface 112 remains engaged with conical surface 68. Should the distance of travel, "running clearance", that is required to bring friction member 40 and 42 into engagement with corresponding faces 14a and 14b of the rotor exceed the distance defined by the lash "x" distance, surface 68 separates from surface 112. However, during the service brake application, an adjustment force is created by the pressurized fluid presented to actuation chamber 38 and atmospheric pressure communicated by passage 63 to diameter 66 of bore 34 that acts on the adjustment screw mechanism 100. This adjustment force acts on projection 110 of the first section 106 of head 104 and in conjunction with the spring force of arms 134, 134' causes stem 102 to rotate with respect to cylindrical body 196 of stem 194 and again bring surface 68 into engagement with surface 112 to reestablish the clutch function. Should the pressure differential exceed a predetermined value, return spring 190 is also overcome and the second member 108 of the ball-in-ramp 150 also moves with the first head 104 of the adjustment screw mechanism 100 to prevent over adjustment. On termination of the communication of pressurized hydraulic fluid to the actuation chamber 38, the piston is returned to a rest position as illustrated in FIG. 2.

Figure 4:
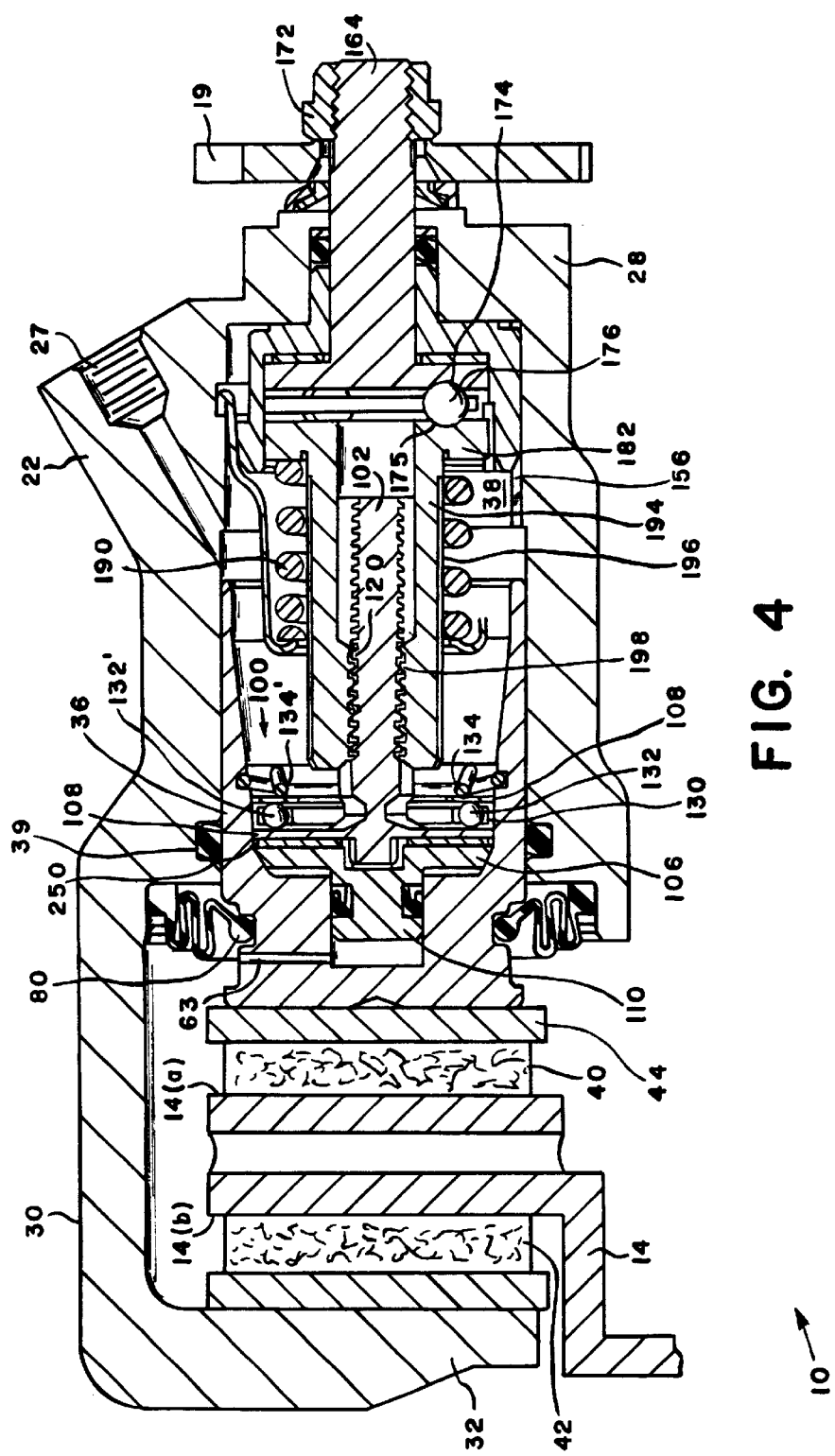
FIG. 4 is an enlarged view of the disc brake and parking brake assembly of FIG. 1 illustrating a parking brake application.

When an operator desires to effect an emergency or parking brake application, an input is applied to lever 19 to develop a static clamping force that urges the first friction member 40 into engagement with face 14a and the second friction member 42 into engagement face 14b to effect a corresponding brake application. The input force that is applied to lever 19 causes the first member 164 to rotate in sleeve 152. Once the force of return spring 190 is overcome, balls 176 are moved in 175 to define a corresponding operational parking brake force. Since the second member 182 is prevented from rotating with respect to sleeve 152, movement of balls 176 in ramp 175 creates a linear force that axially moves stem 194 toward piston 36. This linear movement is transmitted through the adjustment screw mechanism 100 to piston 36 by way of stem 102, the second section 108 of head 104, spring 250 and first section 106 of head 104. The spring force of spring 250 is selected such that the spring may be partially or completely collapsed state as illustrated in FIG. 4 when the operational force is applied to piston 36. The operational force acts on piston 36 and actuation section 28 to develop a corresponding clamping force that is applied to rotor 14, and in particular piston 36 urges the friction member 40 into engagement with face 14a while the actuation section 28 urges the second friction member 42 in engagement face 14b to effect a corresponding parking or emergency brake application. This clamping force is static and remains until the actuation force on lever 19 is removed by an operator to allow the lever 19 rotated back to the rest position illustrated in FIG. 2.

The clamping force developed by the manual input in moving the piston 36 and first 40 and second 42 friction members into engagement with rotor 14 remains static as any change caused by a dimensional change in the disc brake 10 and rotor 14 is absorbed by spring 250. After a parking brake application is initiated, the rotor 14 and disc brake 10 may cool and as a result some thermal contraction may occur. In the disc brake 10 when a parking brake application is initiated, spring 250 is correspondingly compressed by the input force that manually moves the piston 36 and as the disc brake cools in a manner causing a dimensional changes the spring force of spring 250 urges the first section 106 of head 104 against the piston 36 with a same intensity as the initial force to maintain the parking brake application at a same intensity as when initially applied. Thus, the possibility of creep or hot roll is substantially reduced and a parking applied by an operator will continue to hold the vehicle stationary for a duration of a parking brake application.

Figure 5:
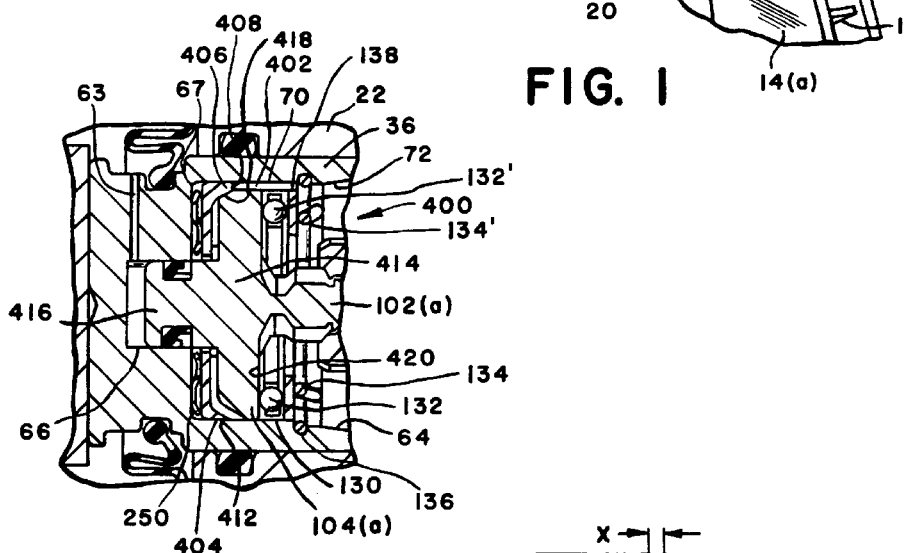
FIG. 5 is an enlarged view of a second embodiment of the screw adjustment mechanism for the parking brake assembly.

FIG. 5 is an illustration of a secondary embodiment of the adjustment screw mechanism 400 and actuation section 28 for an integral parking brake 12 according to the principals of this invention. The structural components differ from that of adjustment screw mechanism 100 in that the conical transition diameter 68 from shoulder 67 in bore 64 of piston 36 is eliminated and the second diameter section 70 extends to shoulder 67 and bore 64 has a plurality of axial slots 402 (only one is shown) that are located in the second diameter section 70. Wave washer or spring 250 is located in bore 64 adjacent shoulder 67 and a disc 404 having a same diameter as the second diameter section 70 is located in bore 64 through the engagement of head 104a of the adjustment screw mechanism 400. Disc 404 has a plurality of radial projections 406 (only one is shown) that are located in the axial slots 402 to prevent disc 404 and a radial face 408 with a conical section 412 adjacent the peripheral edge to define a clutch surface for the adjustment screw mechanism 400. The head 104a of the adjustment screw mechanism 400 is defined as being integral with stem 102a on which threads 120 thereon are mated with threads 198 on stem 194 of the second member 182 of the ball-in-ramp actuator 150. The head 104a has a cylindrical base 414 with a projection 416 that extends in the first diameter 66, a conical section 418 that is designed to be mated with conical surface 412 on disc 404 and a smooth radial surface 420 for receiving balls 132, 132' of roller bearing 130. As described above, the spring action of arms 134, 134' that extend from snap ring 136 act on washer 138 and roller bearing 130 to urge conical surface 418 against conical surface 412 and frictionally retain head 104a from rotating within bore 64.

The service brake application of the second embodiment is identical with that of the first embodiment and a parking or emergency brake is substantially the same in that during the communication of an input force from the ball-in-ramp actuator 150 whereby head 104a acts on disc 404 to compress spring 250 and develop a clamping force that acts on piston 36 for urging the friction member 40 into engagement with face 14a and acts on actuation section 28 for urging the second friction member 42 in engagement face 14b to effect a corresponding parking or emergency brake. When the clamping force is initially applied, the rotor 14 and disc brake 10 have an initial dimension and such dimension may be reduced by thermal contraction through cooling which can result in a change in the engagement relationship between the first 40 and second 42 friction members and rotor 14, fortunately the spring force of spring 250 absorbs any such dimensional change by expanding from a collapsed state to an expanded state to maintain the clamping force static and thereby prevent any change in the parking brake application. Thus spring 250 proportionally expands and contracts as function of thermal changes in the disc brake to sustain the clamping force at a substantially same force level for the duration time of the parking brake application.

We claim:

1. In a disc brake having a support member secured to a vehicle, said support member having first and second guides to align a caliper over a rotor associated with a wheel of the vehicle, said caliper having an actuation section connected by a bridge to an arm, said actuation section having a bore therein for retaining a piston to define an actuation chamber, a first friction member connected to said piston and a second friction member connected to said arm, said actuation chamber on being presented pressurized fluid from a source acting on said piston and actuation section to develop a dynamic clamping force for moving said first and second friction members into engagement with said rotor to effect a first brake application, a ball-in-ramp actuator having a first member axially retained in said actuation chamber and connected to a lever and a second member radially retained in said actuation chamber, an adjustment screw mechanism having a first end connected to said second member of said ball-in-ramp actuator and a second end that engages said piston, said first member of said ball-in-ramp actuator receiving an input force from said lever and rotating to correspondingly act through a linkage defined by said ball-in-ramp actuator to axially move said second member and transmit an actuation force through said adjustment screw mechanism into said piston to produce a static clamping force for moving and maintain said first and second friction members in engagement with said rotor to effect a brake application, said caliper, support member and rotor each responding to thermal expansion and thermal contraction with corresponding dimensional changes during a duration of time for said second brake application, said adjustment screw mechanism being characterized by a head having a first member splined to a second member, a first spring located between said first and second members and a shaft that extends from the second member and is connected to said ball-in-ramp actuator by a threaded connection, said threaded connection including first threads located in a bore of a cylindrical member that extends from said ball-in-ramp actuator and second threads being located on said shaft, said first threads and said second threads having a desired lash there between to permit limited independent movement with respect to said ball-in-ramp actuator said clamping force when initially applied to effect said brake application compressing said first spring between said first member and said second member, said first spring during said duration of time for said brake application proportionally expanding as a function of said thermal contraction of said disc brake to compensate for such dimensional changes in said caliper, support member and rotor by sustaining a substantially constant static clamping force on said piston.

2. In a disc brake having a ball-in-ramp actuator retained in a caliper for supplying a piston with a clamping force to move first and second friction members into frictional engagement with a rotor to effect a parking brake application and an adjustment screw mechanism through which said clamping force is transmitted from said ball-in-ramp actuator into said piston, said disc brake being susceptible to thermal expansion and thermal contraction and as a result said clamping force applied to bring said first and second friction members into engagement with said rotor may change during a duration of time that said parking brake application is initiated and terminated, said adjustment screw mechanism being characterized by a head having a first member splined to a second member, a first spring located between said first and second members and a shaft that extends from the second member and is connected to said ball-in-ramp actuator by a threaded connection, said threaded connection including firsts threads located in a bore of a cylindrical member that extends from said ball-in-ramp actuator and second threads being located on said shaft to define a desired lash there between to define limited independent movement with respect to said ball-in-ramp actuator, said clamping force initially applied to effect said parking brake application compressing said first spring between said first member and said second member, said first spring thereafter proportionally expanding as a function of said thermal contraction of said disc brake such that said, clamping force remains substantially constant for the duration time of said parking brake application.

3. In the disc brake as recited in claim 2 wherein said adjustment screw mechanism is further characterized by a second spring that is connected to said piston and acts on said second member to urge said first member toward said piston, said adjustment screw mechanism being restrained on movement of said piston toward said rotor a distance greater than said lash such that a first end of said first member disengages from said piston and said second spring thereafter causes said first and second members to rotate said shaft and reestablish engagement between said first end and said piston.

4. In a disc brake having a ball-in-ramp actuator retained in a caliper for supplying a piston with a clamping force to move first and second friction members into frictional engagement with a rotor to effect a parking brake application and an adjustment screw mechanism through which said clamping force is transmitted from said ball-in-ramp actuator into said piston, said disc brake being susceptible to thermal expansion and thermal contraction and as a result said clamping force applied to bring said first and second friction members into engagement with said rotor may change during a duration of time that said parking brake application is initiated and terminated, said adjustment screw mechanism being characterized by a head with a shaft extending therefrom, said shaft having a first set of threads that are connected to a second set of threads in said ball-in-ramp actuator, a first spring located between said head and said piston, and a second spring that acts on said head to urge said head and said first spring toward said piston such that a portion of said head engages said piston, said first and second set of threads having a lash there between that permits limited independent movement of said adjustment screw mechanism with respect to said ball-in-ramp actuator, said clamping force applied to initiate said parking brake application compressing said first spring between said head and said piston and said first spring thereafter proportionally expanding and contracting as a function of thermal changes in said disc brake to sustain said clamping force at a substantially constant force level during said duration time of said parking brake application.

* * * * *